United States Patent
Gu et al.

(10) Patent No.: US 12,553,142 B2
(45) Date of Patent: Feb. 17, 2026

(54) METHOD AND ELECTROCHEMICAL SYSTEM FOR RECYCLING SPENT LITHIUM-ION BATTERY

(71) Applicant: EAST CHINA UNIVERSITY OF SCIENCE AND TECHNOLOGY, Shanghai (CN)

(72) Inventors: Shuai Gu, Shanghai (CN); Tongtong Fu, Shanghai (CN); Zirui Guo, Shanghai (CN); Jianguo Yu, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 567 days.

(21) Appl. No.: 18/042,830

(22) PCT Filed: Aug. 1, 2022

(86) PCT No.: PCT/CN2022/109426
§ 371 (c)(1),
(2) Date: Feb. 24, 2023

(87) PCT Pub. No.: WO2023/051017
PCT Pub. Date: Apr. 6, 2023

(65) Prior Publication Data
US 2024/0279831 A1    Aug. 22, 2024

(30) Foreign Application Priority Data
Sep. 28, 2021  (CN) .......................... 202111142974.X
Sep. 28, 2021  (CN) .......................... 202111144885.9

(51) Int. Cl.
*C25C 1/08*    (2006.01)
*C21B 15/00*    (2006.01)
(Continued)

(52) U.S. Cl.
CPC ................ *C25C 1/08* (2013.01); *C21B 15/00* (2013.01); *C22B 3/045* (2013.01); *C22B 3/065* (2013.01);
(Continued)

(58) Field of Classification Search
None
See application file for complete search history.

(56) References Cited

U.S. PATENT DOCUMENTS 6,514,311 B1 *  2/2003  Lin ........................... C25C 1/12
                                                        205/582
9,039,886 B2 *  5/2015  Gong ..................... C01B 32/194
                                                        156/247
(Continued)

FOREIGN PATENT DOCUMENTS

CN    102965508 A     3/2013
CN    106025421 A    10/2016
(Continued)

OTHER PUBLICATIONS

Machine translation of CN-107482273-A (Year: 2017).*
(Continued)

*Primary Examiner* — Harry D Wilkins, III
(74) *Attorney, Agent, or Firm* — Myers Bigel, P.A.

(57) ABSTRACT

The present invention discloses a method for recycling a spent lithium-ion battery, including the following steps: sandwiching a cathode of the spent lithium-ion battery with a conductive acid-resistant material as a cathode of a primary battery system; sandwiching an anode of the spent lithium-ion battery with a conductive acid-resistant material as an anode of the primary battery system; injecting an acid solution into a chamber of the primary battery system; and carrying out, after an electrochemical reaction is completed, solid-liquid separation on a mixed liquor in the chamber.

(Continued)

The present invention further discloses an electrochemical system for recycling a spent lithium-ion battery.

19 Claims, 7 Drawing Sheets

(51) Int. Cl.
| | |
|---|---|
| C22B 3/00 | (2006.01) |
| C22B 3/04 | (2006.01) |
| C22B 3/06 | (2006.01) |
| C22B 3/08 | (2006.01) |
| C22B 3/10 | (2006.01) |
| C22B 3/16 | (2006.01) |
| C22B 3/22 | (2006.01) |
| C22B 7/00 | (2006.01) |
| C22B 26/12 | (2006.01) |
| C22B 47/00 | (2006.01) |
| C25C 1/10 | (2006.01) |
| H01M 10/54 | (2006.01) |

(52) U.S. Cl.
CPC ............... *C22B 3/08* (2013.01); *C22B 3/10* (2013.01); *C22B 3/165* (2013.01); *C22B 3/22* (2013.01); *C22B 7/007* (2013.01); *C22B 23/0423* (2013.01); *C22B 23/0453* (2013.01); *C22B 26/12* (2013.01); *C22B 47/00* (2013.01); *C25C 1/10* (2013.01); *H01M 10/54* (2013.01)

(56) References Cited

U.S. PATENT DOCUMENTS

| | | | | |
|---|---|---|---|---|
| 9,045,842 | B2* | 6/2015 | Han | B32B 38/10 |
| 10,156,017 | B2* | 12/2018 | Shin | C25C 1/10 |
| 12,374,733 | B2* | 7/2025 | Nlebedim | C25C 5/02 |
| 2020/0277704 | A1* | 9/2020 | Takenouchi | C22B 7/00 |
| 2022/0223932 | A1* | 7/2022 | McNally | H01M 10/44 |
| 2023/0033430 | A1* | 2/2023 | Bai | H01M 4/662 |
| 2024/0222732 | A1* | 7/2024 | Yu | C25D 7/0614 |

FOREIGN PATENT DOCUMENTS

| | | | | |
|---|---|---|---|---|
| CN | 107326181 A | | 11/2017 | |
| CN | 107482273 A | * | 12/2017 | ............ H01G 11/30 |
| CN | 108270045 A | | 7/2018 | |
| CN | 110257631 A | * | 9/2019 | ............ C22B 7/006 |
| CN | 110453071 A | | 11/2019 | |
| CN | 110820014 A | | 2/2020 | |
| CN | 110983050 A | | 4/2020 | |
| CN | 111411366 A | | 7/2020 | |
| CN | 112251776 A | | 1/2021 | |
| CN | 112531159 A | | 3/2021 | |
| CN | 112938949 A | | 6/2021 | |
| CN | 113881850 A | | 1/2022 | |
| CN | 113881851 A | * | 1/2022 | ............ C01B 32/324 |
| CN | 118497496 A | * | 8/2024 | ............ C22B 3/165 |
| WO | WO-2017118955 A1 | * | 7/2017 | ............... C22B 3/44 |

OTHER PUBLICATIONS

Machine translation of CN-110257631-A (Year: 2019).*
Machine translation of CN-113881851-A (Year: 2022).*
Machine translation of CN-118497496-A (Year: 2024).*
Zhou et al., Recycling of spent LiCoO2 materials by electrolytic leaching of cathode electrode plate, Journal of Environmental Chemical Engineering, vol. 9, No. 1, Feb. 2021, 104789, pp. 1-9 (Year: 2021).*
Cao et al., An innovative approach to recover anode from spent lithium-ion battery, Journal of Power Sources, vol. 483, Jan. 2021, 229163, pp. 1-10 (Year: 2021).*
Yang et al., A process for combination of recycling lithium and regenerating graphite from spent lithium-ion battery, Waste Management, vol. 85, Feb. 2019, pp. 529-537 (Year: 2019).*
"International Search Report corresponding to International Application No. PCT/CN2022/109426 mailed Nov. 2, 2022".
"International Preliminary Report on Patentability corresponding to International Application No. PCT/CN2022/109426 issued Apr. 2, 2024".

* cited by examiner

METHOD AND ELECTROCHEMICAL SYSTEM FOR RECYCLING SPENT LITHIUM-ION BATTERY

CROSS-REFERENCE TO RELATED APPLICATIONS

This application is a 35 U.S.C. § 371 national phase application of PCT Application PCT/US2022/109426 filed on Aug. 1, 2022, which claims the benefit of priority to Chinese Application No. 202111142974.X, filed on Sep. 28, 2021, and Chinese Application No. 202111144885.9 filed on Sep. 28, 2021, the entire contents of each of which are incorporated by reference herein in its entirety.

FIELD OF THE INVENTION

The present invention relates to the technical field of waste recycling, and specifically, to a method and electrochemical system for recycling a spent lithium-ion battery.

BACKGROUND OF THE INVENTION

Lithium-ion battery is a new type of widely used high-energy battery. With the development of electronic information market and electric vehicle industry in recent years, the global lithium-ion battery industry scale has increased significantly. In 2020, the global lithium-ion battery shipment volume reached 294.5 GWh and the global market size was about 53.5 billion USD. The lithium-ion battery industry is mostly concentrated in China. It is estimated that by 2026, the global LIBs market capitalization will reach 139.36 billion USD. According to statistics, China produced 15.722 billion lithium-ion batteries in 2019, and the rechargeable batteries to be recycled will be 780,000 tons by 2025. Spent lithium-ion batteries contain a large amount of heavy metal elements (Co, Ni, Mn, etc.) and hazardous substances (electrolytes and organic solvents). Improper disposal of those batteries will cause great threats and harm to the ecological environment and human health. In addition, waste lithium-ion batteries contain a large amount of valuable metal elements, where lithium and cobalt pertain to national strategic resources. Therefore, in order to sustainably utilize resources and protect mineral resources, it is necessary to carry out recycling of spent lithium-ion batteries.

For lithium-ion batteries, the active substances of the cathode are mainly $LiCoO_2$, $LiNi_xCo_yMn_zO_2$ (x+y+z=1), $LiMn_2O_4$, $LiFePO_4$, and the like, the current collector of the cathode is aluminum foil, the active substance of the anode is graphite, and the current collector of the anode is copper foil. Currently, methods for recycling spent LIBs include: hydrometallurgy, pyrometallurgy, and biometallurgy. By pyrometallurgy, high-temperature roasting causes high energy consumption and produces a large amount of hazardous gases during the reaction process. By biometallurgy, the microbiological culture takes a long time, and the efficiency of metal leaching is not ideal. However, the hydrometallurgy is widely used due to high recovery efficiency and mild reaction conditions. The conventional hydrometallurgy includes four steps: pretreatment, leaching, separation and recycling, and reuse. The pretreatment mainly includes a series of operations on a spent lithium-ion battery: dismantling, crushing, pulverizing, screening, filtering, sorting, magnetic separation, primary grinding, sorting, and secondary grinding. The leaching is to dissolve valent elements in an acidic or alkaline solution with the help of a reducing agent, or to reduce or oxidize high-valence transition metals through electrochemical reduction or oxidation. However, in conventional electrochemical reduction methods, the electro-oxidation reaction of hydroxide ions or chloride ions occurs at the anode, causing excessively high tank voltage and release of harmful gases. In addition, by the conventional electrochemical reduction methods, only the cathode materials of the spent lithium-ion battery can be recycled, and the leaching process requires the consumption of electricity.

In view of this, the present invention is provided.

SUMMARY OF THE INVENTION

The technical problem to be resolved in the present invention is to provide a method for recycling cathodes and anodes of a spent lithium-ion battery simultaneously and separating valuable elements. The method requires only cathodes and anodes from spent lithium-ion batteries, without a series of complex pretreatment operations on the spent cathodes. In addition, by the method, the cathodes and anodes from spent lithium-ion batteries can be recycled at the same time, and valuable elements can be separated, which is greatly improved compared with the electrochemical leaching method, and moreover there is no need to add an external power supply, which saves energy and can also generate electricity.

To resolve the above technical problems, the following technical solutions are provided in the present invention.

According to a first aspect, the present invention provides a method for recycling a spent lithium-ion battery, including the following steps:

sandwiching a cathode of the spent lithium-ion battery with a conductive acid-resistant material as a cathode of a primary battery system;

sandwiching an anode of the spent lithium-ion battery with a conductive acid-resistant material as an anode of the primary battery system;

injecting an acid solution into a chamber (also referred to as electrolyzer) of the primary battery system; and carrying out, after the electrochemical reaction is completed, solid-liquid separation on a mixed liquor in the chamber.

In the present invention, the method further includes simply disassembling the cathode and the anode of the spent lithium-ion battery, that is, dismantling the spent lithium-ion battery to obtain the cathode and the anode. The "dismantling" herein is to simply disassemble the cathode and the anode without further processing of the cathode and the anode. However, in the conventional recycling method of a decommissioned lithium-ion battery, the cathode material needs to be further subjected to a series of operations: dismantling, pulverizing, screening, sorting, magnetic separation, grinding, primary grinding, sorting of the positive electrode material, and secondary grinding. Therefore, the method of the present invention avoids the complex pretreatment process of the cathode material.

In the present invention, the cathode material or the anode material of the lithium-ion battery is sandwiched in the conductive acid-resistant material to form a "sandwich" structure. There may be two or more (such as three or four) layers of conductive acid-resistant materials. Specifically, the "sandwich" structure may be: conductive acid-resistant material+cathode of lithium-ion battery+conductive acid-resistant material. That is, the cathode of the lithium-ion battery is sandwiched with two layers of conductive acid-resistant materials. Alternatively, the "sandwich" structure may be: conductive acid-resistant material+anode of lithium-ion battery+conductive acid-resistant material. That is, the anode of the lithium-ion battery is sandwiched with two layers of conductive acid-resistant materials.

In an exemplary implementation, the conductive acid-resistant material is provided with pores.

In an exemplary implementation, the conductive acid-resistant material includes at least one of platinum, gold, palladium, lead, titanium, aluminum, copper, stainless steel, graphite, glassy carbon, carbon fiber, graphene, carbon cloth, and carbon felt, such as platinum (including platinum mesh and platinum sheet), gold mesh, palladium mesh, lead mesh, titanium mesh, aluminum mesh, copper mesh, stainless steel mesh, graphite material, carbon material, carbon cloth, or carbon felt.

Specifically, the "sandwich" structure may be: titanium mesh+cathode of lithium-ion battery+titanium mesh. That is, the cathode of the lithium-ion battery is sandwiched with two layers of titanium meshes. Alternatively, the "sandwich" structure may be: titanium mesh+anode of lithium-ion battery+titanium mesh. That is, the anode of the lithium-ion battery is sandwiched with two layers of titanium meshes.

In some implementations, in order to fix the cathode and the anode of the primary battery system, a fixing mesh may be further used to fix the cathode and the anode mostly in a case that a flexible conductive acid-resistant material is used. For example, the "sandwich" structure may be: fixing mesh+carbon cloth (or carbon felt)+cathode of lithium-ion battery+carbon cloth (or carbon felt)+fixing mesh. The fixing mesh is made of an acid-resistant material. The cathode of the lithium-ion battery is sandwiched with two layers of carbon cloth (or carbon felt) and then fixed with the fixing mesh from both sides. Alternatively, the "sandwich" structure may be: fixing mesh+carbon cloth+anode of lithium-ion battery+carbon cloth+fixing mesh. The fixing mesh is made of an acid-resistant material. The anode of the lithium-ion battery is sandwiched with two layers of carbon cloth (or carbon felt) and then fixed with the fixing mesh from both sides.

Due to the poor conductivity of cathode materials such as lithium cobalt oxide, the voltage loss during the whole process is relatively large, which will eventually cause excessively high tank voltage. In the present invention, the "sandwich" electrode structure is used to be directly in contact with the current collector of the cathode, thereby greatly reducing the voltage loss and the cell potential. It should be noted that the term "cell potential" used herein refers to the voltage difference between the counter electrode and the working electrode of the entire electrolyzer.

In some implementations, in order to increase the recycling efficiency, there may be two or more (such as three or four) cathodes or anodes of the spent lithium-ion battery sandwiched in the conductive acid-resistant material. A plurality of cathodes may be sandwiched in the conductive acid-resistant material in a tiled manner, or may be sandwiched in the conductive acid-resistant material in a stacked manner, or may be arranged in a manner of a combination of the above two manners.

The cathode of the lithium-ion battery is generally composed of a current collector (Al foil) and a active substance attached to the current collector, and the anode of the lithium-ion battery is generally composed of a current collector (Cu foil) and a active substance attached to the current collector. The cathode current collector is usually aluminum foil. The cathode active substance varies according to the type of the lithium-ion battery. In the present invention, the cathode active substance includes, but is not limited to, one or more of lithium cobalt oxide ($LiCoO_2$), lithium manganese oxide ($LiMn_2O_4$), lithium iron phosphate ($LiFePO_4$), and lithium nickel-cobalt manganese oxide ($LiNi_xCo_yMn_zO_2$, $x \geq 0$, $y \geq 0$, $z \geq 0$, $x+y+z=1$). In the cathode, the change of the proportion of the cathode active substance only affects the output voltage of the primary battery.

In the present invention, the anode current collector is copper foil, and the anode active substance includes, but is not limited to, one or more of graphite, active carbon, and lithium titanate. The change of the proportion of the anode active substance does not affect the output voltage of the primary battery, because the anode active substance does not participate in the reaction, and only the anode current collector (copper foil) participates in the electrochemical reaction.

In the present invention, the acid solution may be organic acid or inorganic acid. The organic acid may include one or more of formic acid, acetic acid, propionic acid, butyric acid, caprylic acid, adipic acid, oxalic acid, malonic acid, succinic acid, maleic acid, tartaric acid, benzoic acid, phenylacetic acid, phthalic acid, terephthalic acid, valeric acid, caproic acid, capric acid, stearic acid, palmitic acid, acrylic acid, ascorbic acid, and malic acid. The inorganic acid may include one or more of hydrochloric acid, sulfuric acid, nitric acid, and phosphoric acid.

The acid solution mainly functions to provide hydrogen ions for binding oxygen in the transition metal oxide on the cathode, and to help dissolve copper on the anode current collector in the solution. During the reaction, the concentration of hydrogen ions in the solution affects the reaction rate and output voltage. In the present invention, the concentration of the acid solution is preferably 0.1 M to 5 M, such as 0.1 M, 0.2 M, 0.5 M, 1 M, 1.5 M, 2 M, 3 M, 4 M, or 5 M.

In a preferred implementation, the acid solution is inorganic acid, such as hydrochloric acid, sulfuric acid, or nitric acid. Further, when the acid solution is hydrochloric acid, sulfuric acid, or phosphoric acid, the concentration of the acid solution is 0.5 M to 2 M; when the acid solution is nitric acid, the concentration of the acid solution is 1 M to 5 M; and when the acid solution is organic acid, the concentration of the acid solution is 1 M to 5 M.

In a more preferred solution in the present invention, the acid solution is hydrochloric acid or phosphoric acid. When hydrochloric acid or phosphoric acid is used as an electrolyte, the chloride ion in the hydrochloric acid or the phosphate ion in the phosphoric acid coordinates with the transition metal in the positive electrode active substance, increasing the leaching rate of metal ions and effectively increasing the output voltage. The concentration of hydrogen ions mainly affects the reaction rate, that is, the leaching rate. A higher concentration indicates a higher leaching rate; but the excessively high concentration causes acid waste. Therefore, preferably, the concentration of hydrochloric acid is 0.5 M to 2 M, such as 0.5 M, 1 M, or 2 M, more preferably, 1 M. Preferably, the concentration of phosphoric acid is 0.5 M to 2 M, such as 0.5 M, 1 M, 1.5 M, or 2 M, etc.

In another preferred solution, the acid solution is sulfuric acid. When sulfuric acid is used as an electrolyte, metal ions are leached out through the primary battery reaction, which facilitates direct electrodeposition of copper ions in the chamber of the anode by using the electroreduction method, so as to recycle metal copper. Preferably, the concentration of sulfuric acid is 0.5 M to 2 M, such as 0.5 M, 1 M, 1.5 M, or 2 M, etc.

During the primary battery reaction, the copper foil in the anode in the primary battery loses two electrons to be oxidized into $Cu^{2+}$ to enter the electrolyte, and the electrons reach the cathode through the external circuit and reduce the high-valent transition metal in the positive plate to +2 valence to enter the electrolyte. The dissolved transition metal ions and copper ions coordinate with Cl⁻ in the hydrochloric acid solution to form a coordination complex. The final recycled products include: valuable elements (Li, Co, Ni, and Mn) and $Cu^{2+}$ dissolved in the solution, partial Cu metal powder electrodeposited on the cathode, and active substance powder (such as active carbon powder) remaining on the anode. The active substance powder remaining on the anode may be directly used to prepare a new anode material of the lithium-ion battery, and partial copper deposited on the cathode may be directly melted to prepare a copper plate or the like, achieving the recycling and efficient recovery of resources.

In an example, the electrolyte is hydrochloric acid, the cathode active substance is lithium cobalt oxide, and the anode current collector is copper foil, so the chemical equation of the primary battery reaction is as follows:

Overall reaction:

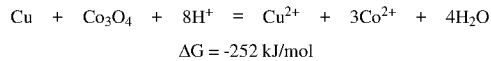

$$\Delta G = -252 \text{ kJ/mol}$$

Cathode reaction:

Anode reaction:

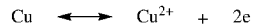

According to the HSC thermodynamic analysis, at 25° C., for the reaction, $\Delta G=-252$ KJ/mol and $\Delta H=-342$ KJ/mol, indicating that the reaction is an exothermic reaction that is spontaneous at room temperature without an external power supply, saving energy. In addition, the theoretical open-circuit voltage of the primary battery is 1.3 V, which can output energy to the outside. Different electrolytes and concentrations correspond to different electrochemical reactions. In general, the output voltage of the primary battery ranges from 0.4 V to 1.2 V. In the 1M sulfuric acid system, the open-circuit potential obtained by testing is 0.8 V, the short-circuit current generated when using 2 cm*4 cm positive electrode material and negative electrode material is 0.076 A, and the maximum output power is 0.0608 W.

With the increase of temperature, $\Delta G$ of the reaction increases gradually, indicating that the increase of temperature is not conducive to the occurrence of this reaction. This is because the primary battery reaction is an exothermic reaction, and the increase of temperature is not conducive to output voltage and current density. Preferably, the reaction temperature is 0° C. to 80° C., such as 0° C., 5° C., 10° C., 20° C., 25° C., 30° C., 35° C., 40° C., 45° C., 50° C., 55° C., 60° C., 65° C., 70° C., 75° C., or 80° C., more preferably, 0° C. In addition, the stirring speed also affects the reaction to some extent. In the present invention, the stirring speed is preferably 300 to 1660 rpm, such as 300 rpm, 740 rpm, 1180 rpm, 1560 rpm, or 1660 rpm.

In the present invention, the reaction time of leaching is 60 to 240 min, more preferably, 120 to 180 min, such as 60 min, 70 min, 80 min, 90 min, 100 min, 110 min, 120 min, 130 min, 140 min, 150 min, 160 min, 170 min, 180 min, 190 min, 200 min, 210 min, 220 min, 230 min, or 240 min.

In a preferred implementation, a separator for separating the cathode and the anode is further provided in the chamber of the primary battery system. That is, the chamber of the primary battery system is divided into a cathodic chamber and a anodic chamber. The separator only allows small molecules (such as water molecules) to pass through, and the leached metal ions ($Cu^{2+}$) and valent metal ions ($Li^+$, $Co^{2+}$, $Ni^{2+}$, and $Mn^{2+}$) cannot pass through the separator. Therefore, $Cu^{2+}$ is confined in the electrolyte in the anodic chamber and will not enter the cathodic chamber; and the valuable metal ions are confined in the electrolyte in the cathodic chamber and will not enter the anodic chamber, so the separation of $Cu^{2+}$ and valuable metal ions is achieved. The electrolyte in the anodic chamber may be further recycled through electroreduction to obtain Cu powder, with the cell potential for copper electrolysis of 1.8 V to 2.5 V, usually controlled to 1.9 V.

In the above implementations, the specific type of the separator is not limited, as long as the separation of $Cu^{2+}$ and valuable metal ions can be achieved. For example, the separator includes, but is not limited to, one or more of polyethylene microporous membrane, polypropylene microporous membrane, nylon microporous membrane, nitrocellulose microporous membrane, cellulose acetate microporous membrane, polysulfone-based microporous membrane, polyamide-based microporous membrane, polyacrylonitrile microporous membrane, polyvinyl chloride microporous membrane, polytetrafluoroethylene microporous membrane, polyvinylidene fluoride microporous membrane, and polycarbonate microporous membrane.

In a preferred implementation, the separator is obtained by dismantling the spent lithium-ion battery, so all parts of the spent lithium-ion battery can be fully utilized. Preferably, the separator is a polyethylene separator or a polypropylene separator with small and uniformly distributed pores, which can not only block the passage of $Cu^{2+}$ and valent metal ions, but also have a certain flux to ensure the leaching rate, so it has good comprehensive performance.

In another preferred implementation, an external power supply is further added in an external circuit of the primary battery system, the cathode of the primary battery system is in communication with a cathode of the external power supply, and the anode of the primary battery system is in communication with an anode of the external power supply. When no external power supply is added, although the reaction can occur spontaneously, it is difficult to further increase the overall recycling rate. Therefore, by adding an external power supply, the reaction can be promoted, and the leaching rate can be increased, thereby increasing the overall recycling rate.

By using the method in the present invention, in the hydrochloric acid, sulfuric acid, or nitric acid system, the leaching ratio can reach 99%, for example, the leaching ratio is not lower than 99.0%, not lower than 99.1%, not lower than 99.2%, not lower than 99.3%, not lower than 99.4%, not lower than 99.5%, not lower than 99.6%, not lower than 99.7%, not lower than 99.8%, or not lower than 99.9%. It should be noted that the term "leaching ratio" herein refers to leaching efficiency, and it is calculated according to the following formula:

$$\text{Leaching ratio} = m/M \times 100\%$$

In the above formula, m is the content of a metal element in the leaching solution, and M is the total content of the metal element in the spent cathode material.

According to a second aspect, the present invention provides an electrochemical system for recycling a spent lithium-ion battery, including an electrolyzer, a cathode, and an anode, the electrolyzer is filled with an electrolyte, the cathode and the anode are electrically connected by a wire, and both the cathode and the anode are immersed in the electrolyte. The cathode is obtained by sandwiching a cathode of the spent lithium-ion battery with a conductive acid-resistant material, the anode is obtained by sandwiching an anode of the spent lithium-ion battery with a conductive acid-resistant material, and the electrolyte is an acid solution.

In a preferred implementation, a separator for separating the cathode and the anode is further provided in the electrolyzer. That is, the electrolyzer is divided into a cathodic chamber and an anodic chamber. The separator includes, but is not limited to, one or more of polyethylene microporous membrane, polypropylene microporous membrane, nylon microporous membrane, nitrocellulose microporous membrane, cellulose acetate microporous membrane, polysulfone-based microporous membrane, polyamide-based microporous membrane, polyacrylonitrile microporous membrane, polyvinyl chloride microporous membrane, polytetrafluoroethylene microporous membrane, polyvinylidene fluoride microporous membrane, and polycarbonate microporous membrane. Preferably, the separator is a separator in the spent lithium-ion battery.

In a preferred implementation, in order to increase production for industrial application, a plurality of cathodes, anodes, and separators may be disposed in the electrolyzer, and the plurality of cathodes, anodes, and separators are arranged in the electrolyzer in the repetitive sequence of cathode/separator/anode/separator/cathode/separator/anode, thereby increasing the quantity for simultaneous processing.

In a preferred implementation, an external power supply is further connected onto a circuit between the cathode and the anode, the cathode is in communication with a cathode of the external power supply, and the anode is in communication with an anode of the external power supply. By adding an external power supply, the reaction can be promoted, and the leaching rate can be increased, thereby increasing the overall recycling efficiency.

Compared with the prior art, the beneficial effects of the present invention are as follows.

1. The method for recycling a spent lithium-ion battery in the present invention requires only dismantlement of cathodes, without a series of complex pretreatment operations, such as pulverizing, ultrasonic vibration, roasting, screening, sorting, magnetic separation, primary grinding, sorting of the cathode material, and secondary grinding, on the cathode and anode materials of the spent lithium-ion battery.

2. By using the method for recycling a spent lithium-ion battery in the present invention, the reaction can occur spontaneously without an external power supply, saving energy; and the energy can also be outputted to the outside with the output voltage of 0.4 V to 1.2 V.

3. Compared with the method for recycling the cathode of the spent lithium-ion battery through electrochemical reduction, the method in the present invention does not have the problem of high cell potential, has high economic efficiency, and can achieve the recycling and separation of the cathode and anode materials simultaneously.

4. By using the method for recycling a spent lithium-ion battery in the present invention, the valuable elements (such as Li, Co, Ni, and Mn) in the cathode of the spent lithium-ion battery and the copper and carbon powders in the anode can be recycled at the same time.

5. By using the method for recycling a spent lithium-ion battery in the present invention, a separator is provided in the electrolyzer for separating the cathodes and anodes of the primary battery, to form a cathodic chamber and an anodic chamber. The cathodic chamber contains leached valuable elements, and the anodic chamber contains copper ions, but the separator only allows small molecules to pass through, so the separation of the valuable elements and the copper ions is achieved. In addition, valuable copper sheets can be recovered from the copper ions in the negative electrode chamber through electrodeposition.

6. By using the method for recycling a spent lithium-ion battery in the present invention, the leaching efficiency of the valuable elements in the cathode is high, and in the hydrochloric acid, sulfuric acid, or nitric acid system, the leaching ratio can reach 99%.

DETAILED DESCRIPTION OF THE INVENTION

The present invention is further described below with reference to the accompanying drawings and specific examples, so that a person skilled in the art can better understand and implement the present invention, but the examples are not intended to limit the present invention.

Unless otherwise defined, meanings of all technical and scientific terms used in this specification are the same as those usually understood by a person skilled in the art to which the present invention belongs. In this specification, terms used in the specification of the present invention are merely intended to describe the specific examples, but are not intended to limit the present invention. The term "and/or" used in this specification includes any and all combinations of one or more related listed items.

Unless otherwise specified, the experimental methods used in the following examples are all conventional methods, and the materials and reagents used in the following examples are all commercially available.

Example 1

In this example, a hydrochloric acid leaching system is used without a separator. A cathode of a spent lithium-ion battery is lithium cobalt oxide, and an anode of the spent lithium-ion battery is carbon powder.

(1) Dismantlement

The spent lithium-ion battery with lithium cobalt oxide as the cathode and carbon powder as the anode was fully discharged and dried, and then manually dismantled in a glovebox to remove the casing, and the separator and the electrode were separated to obtain cathodes and anodes.

(2) Leaching Out Li and Co by the Primary Battery Method

After the cathodes and anodes were dried, the cathodes were disposed in a "sandwich" electrode structure as a cathode of a primary battery system (the cathode of the spent lithium-ion battery was sandwiched with two layers of platinum meshes), and the anode was disposed in the "sandwich" electrode structure as an anode of the primary battery system (the anode of the spent lithium-ion battery was sandwiched with two layers of platinum meshes). Hydrochloric acid was added in the primary battery system in concentrations of 0.1 M, 0.5 M, 1 M, and 2 M respectively and in volumes of 300 mL, 400 mL, and 500 mL respectively, at stirring speeds of 300 rpm, 740 rpm, 1180 rpm, 1560 rpm, and 1660 rpm respectively, at reaction temperatures of 20° C., 40° C., 60° C., and 80° C. respectively, for 120 min. After the reaction, the resultant solid-liquid mixture was subjected to suction filtration for separation, to obtain a metal-rich leaching solution.

The reaction equation is as follows:

Figure 1:
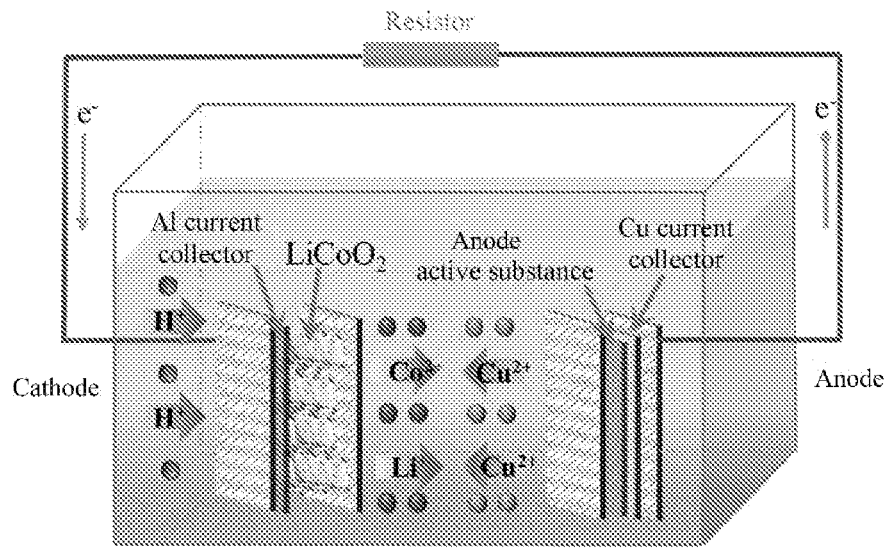
FIG. 1 is a schematic structural diagram of a first primary battery system constructed by the present invention.
Figure 2:
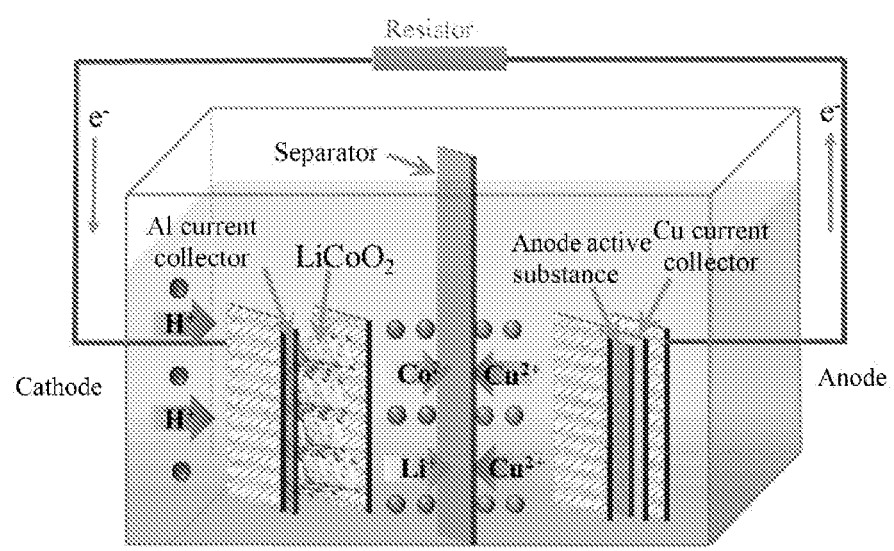
FIG. 2 is a schematic structural diagram of a second primary battery system constructed by the present invention.
Figure 3:
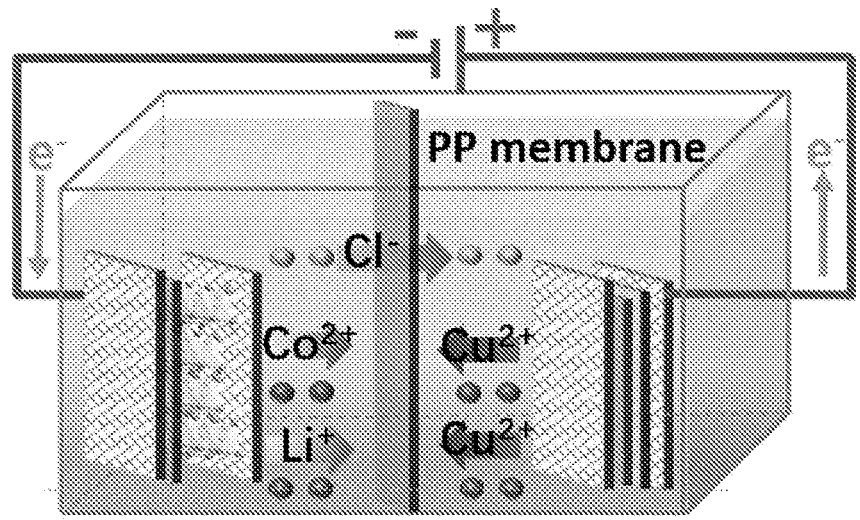
FIG. 3 is a schematic structural diagram of a third primary battery system constructed by the present invention.
Figure 4:
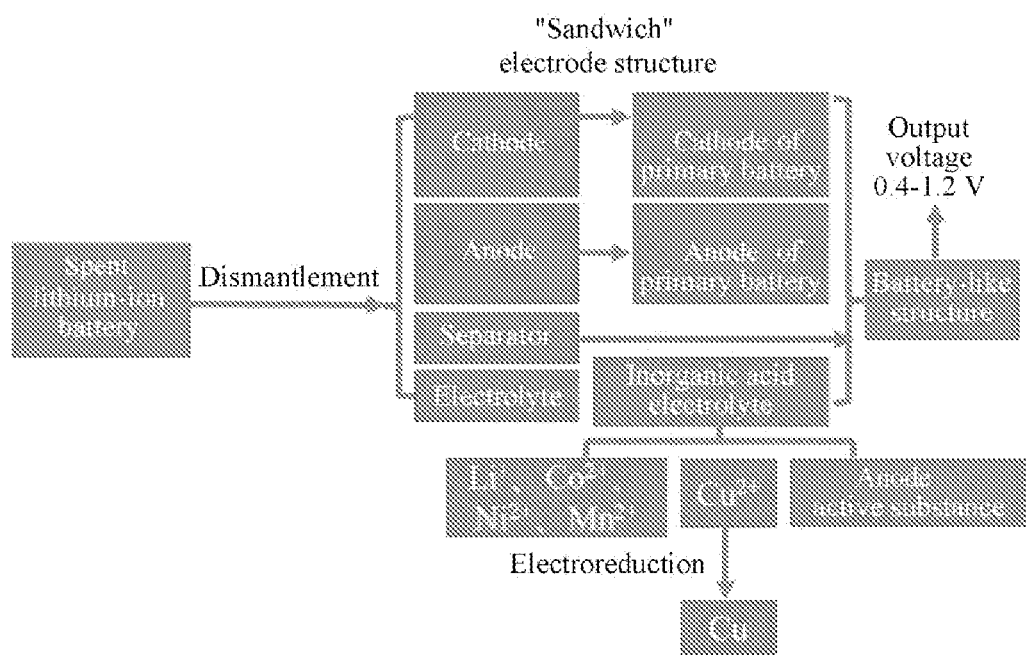
FIG. 4 is a block diagram of recycling cathodes and anodes of a spent lithium-ion battery simultaneously by using the method of the present invention.
Figure 5:
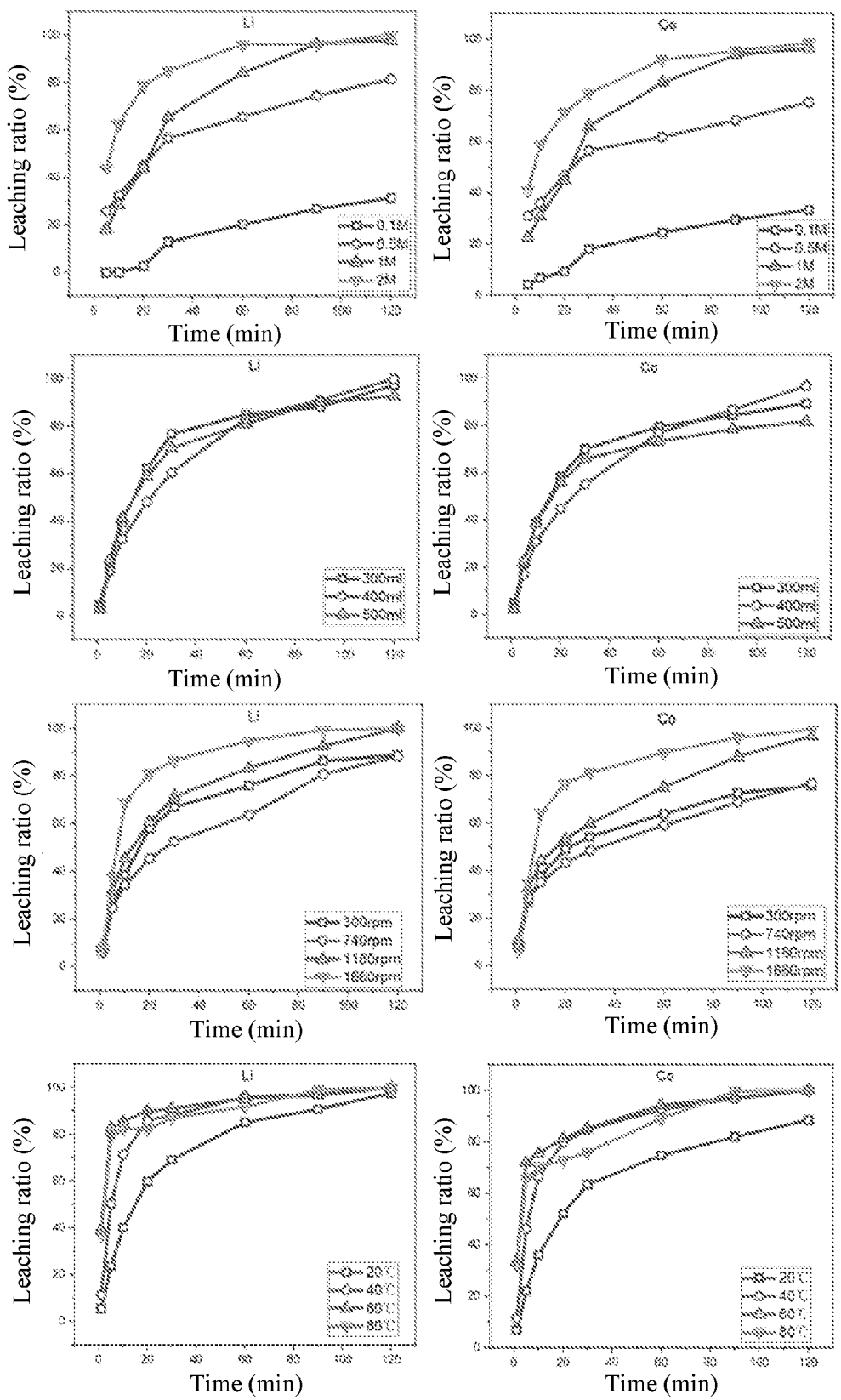
FIG. 5 shows the effects of a hydrochloric acid concentration, a solid-liquid ratio, a stirring speed, and a temperature on leaching ratios of Li and Co when cathodes and anodes of a spent lithium-ion battery are recycled with a hydrochloric acid leaching system in Example 1.

Experiments were carried out by controlling variables, and the concentration of the metal ions in the leaching solution was determined through ICP analysis. The results are shown in FIG. 5.

It can be seen from this figure that the optimal condition includes a hydrochloric acid concentration of 1 M, a hydrochloric acid volume of 400 mL, a stirring speed of 1560 rpm, and a reaction temperature of 20° C., and the leaching ratios of the finally obtained Li and Co are >99% and >99% respectively, and the output voltage is 0.45 V.

Example 2

In this example, a nitric acid leaching system is used without a separator. A cathode of a spent lithium-ion battery is lithium manganese oxide (LiMn$_2$O$_4$), and an anode of the spent lithium-ion battery is lithium titanate.

(1) Dismantlement

The spent lithium-ion battery with lithium manganese oxide as the cathode and lithium titanate as the anode was fully discharged and dried, and then manually dismantled in a glovebox to remove the casing, and the separator and the electrode were separated to obtain cathodes and anodes.

(2) Leaching Out Li and Mn by the Primary Battery Method

After the cathodes and anodes were dried, the cathodes were disposed in a "sandwich" electrode structure as a cathode of a primary battery system (the cathode of the spent lithium-ion battery was sandwiched with two layers of platinum meshes), and the anode was disposed in the "sandwich" electrode structure as an anode of the primary battery system (the anode of the spent lithium-ion battery was sandwiched with two layers of platinum meshes). Nitric acid was added in the primary battery system in a concentration of 2 M and in a volume of 300 mL, at a stirring speed of 1180 rpm, at a reaction temperature of 20° C., for 120 min. After the reaction, the resultant solid-liquid mixture was subjected to suction filtration for separation, to obtain a metal-rich leaching solution.

The reaction equation is as follows:

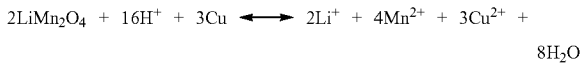

Figure 6:
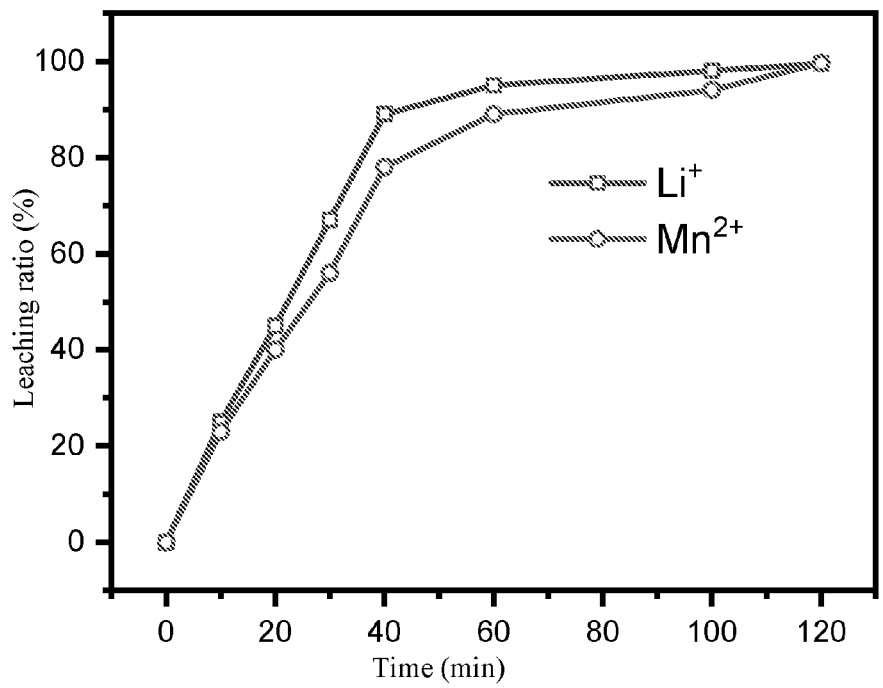
FIG. 6 is a graph showing the change of the leaching ratio of Li and Mn with time when cathodes and anodes of a spent lithium-ion battery are recycled with a nitric acid leaching system in Example 2.

Experiments were carried out by controlling variables, and the concentration of the metal ions in the leaching solution was determined through ICP analysis. The results are shown in FIG. 6.

It can be seen from this figure that the leaching ratios of the finally obtained Li and Mn are >99% and >99% respectively, and the output voltage is 1.16 V.

Example 3

In this example, a sulfuric acid leaching system is used without a separator. A cathode of a spent lithium-ion battery is lithium iron phosphate, and an anode of the spent lithium-ion battery is carbon powder.

(1) Dismantlement

The spent lithium-ion battery with lithium iron phosphate as the cathode and carbon powder as the anode was fully discharged and dried, and then manually dismantled in a glovebox to remove the casing, and the separator and the electrodes were separated to obtain cathodes and anodes.

(2) Leaching Out Li and Fe by the Primary Battery Method

After the cathodes and anodes were dried, the cathodes were disposed in a "sandwich" electrode structure as a cathode of a primary battery system (the cathode of the spent lithium-ion battery was sandwiched with two layers of platinum meshes), and the anodes were disposed in the "sandwich" electrode structure as an anode of the primary battery system (the anode of the spent lithium-ion battery was sandwiched with two layers of platinum meshes). Sulfuric acid was added in the primary battery system in a concentration of 1 M and in a volume of 300 mL, at a stirring speed of 1000 rpm, at reaction temperatures of 20° C. and 60° C. respectively, for 120 min. After the reaction, the resultant solid-liquid mixture was subjected to suction filtration for separation, to obtain a metal-rich leaching solution.

The reaction equation is as follows:

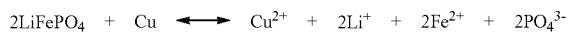

$$2LiFePO_4 + Cu \leftrightarrow Cu^{2+} + 2Li^+ + 2Fe^{2+} + 2PO_4^{3-}$$

Figure 7:
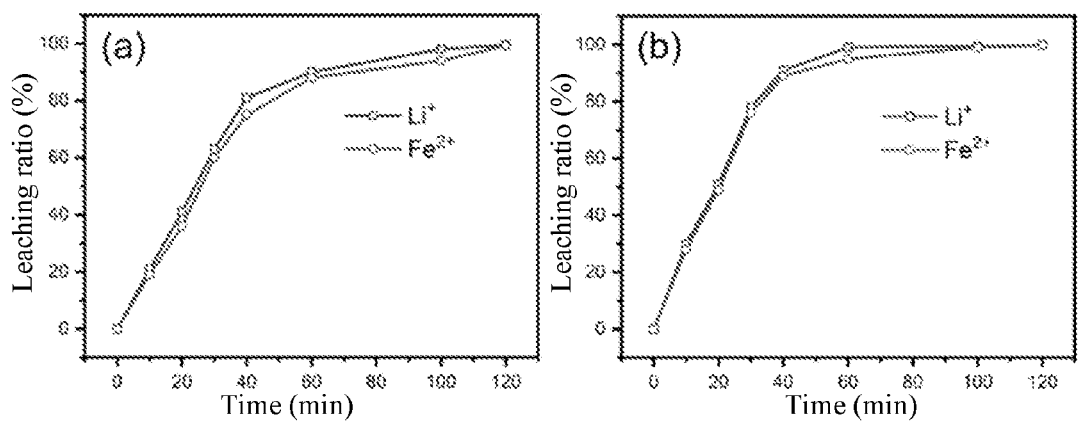
FIG. 7 is a graph showing the change of the leaching ratio of Li and Fe with time at 20° C. (a) and 60° C. (b) when cathodes and anodes of a spent lithium-ion battery are recycled with a sulfuric acid leaching system in Example 3.

Experiments were carried out by controlling variables, and the concentration of the metal ions in the leaching solution was determined through ICP analysis. The results are shown in FIG. 7.

It can be seen from this figure that the leaching ratios of the finally obtained Li and Fe are >99% and >99% respectively, the output voltage at 20° C. is 1.0 V, and the output voltage at 60° C. is 1.1 V. It can be seen that the increase of temperature not only helps increase the output voltage, but also helps increase the leaching rate.

Example 4

In this example, a hydrochloric acid leaching system is used with a separator. A cathode of a spent lithium-ion battery is lithium cobalt oxide, and an anode of the spent lithium-ion battery is carbon powder.
(1) Dismantlement The spent lithium-ion battery with lithium cobalt oxide as the cathode and carbon powder as the anode was fully discharged and dried, and then manually dismantled in a glovebox to remove the casing, and the separator and the electrodes were separated to obtain cathodes and anodes.
(2) Leaching Out Li and Co by the Primary Battery Method After the cathodes and anodes were dried, the separator obtained through dismantlement was washed and dried, the cathode was disposed in a "sandwich" electrode structure as a cathode of a battery-like structure device (the cathode of the spent lithium-ion battery was sandwiched with two layers of platinum meshes), and the anode was disposed in the "sandwich" electrode structure as an anode of the battery-like structure device (the anode of the spent lithium-ion battery was sandwiched with two layers of platinum meshes). Hydrochloric acid was added in the primary battery system, and the polyethylene separator obtained through dismantlement was used as a separator of the battery-like structure device for separation into cathodic and anodic chambers. Hydrochloric acid was added in concentrations of 0.1 M, 0.5 M, 1 M, and 2 M respectively and in volumes of 300 mL, 400 mL, and 500 mL respectively, at stirring speeds of 300 rpm, 740 rpm, 1180 rpm, 1560 rpm, and 1660 rpm respectively, at reaction temperatures of 20° C., 40° C., 60° C., and 80° C. respectively, for 120 min. After the reaction, the resultant solid-liquid mixture was subjected to suction filtration for separation, to obtain a cathodic chamber solution and a anodic chamber solution respectively. The anodic chamber solution was electro-reduced with a copper electrode to obtain a copper powder, with the voltage for copper electrolysis of 1.8 to 2.5 V, usually controlled to 1.9 V. During the reaction, the output voltage of the battery-like structure was tested to be 0.44 V.

Experiments were carried out by controlling variables, and the concentration of the metal ions in the positive electrode chamber was determined through ICP analysis. The results are shown in FIG. 8.

Figure 8:
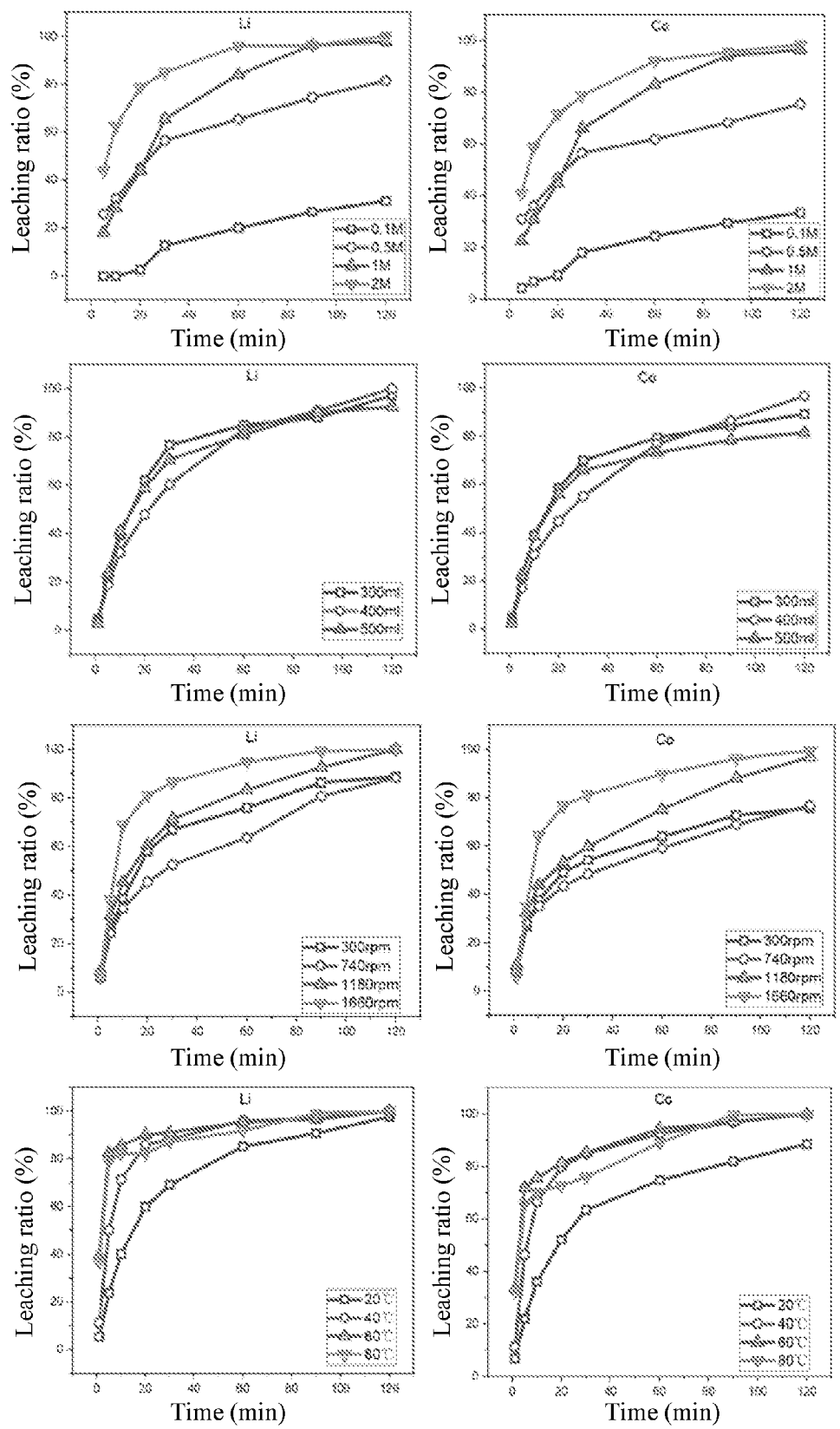
FIG. 8 shows the effects of a hydrochloric acid concentration, a solid-liquid ratio, a stirring speed, and a temperature on leaching ratios of Li and Co when cathodes and anodes of a spent lithium-ion battery are recycled with a hydrochloric acid leaching system in Example 4.

It can be seen from FIG. 8 that the optimal condition includes a hydrochloric acid concentration of 1 M, a hydrochloric acid volume of 400 mL, a stirring speed of 1560 rpm, and a reaction temperature of 60° C., and the leaching ratios of the finally obtained Li and Co are both >99%.

Example 5

In this example, a $H_2SO_4$ leaching system is used with a separator. A cathode of a spent lithium-ion battery is lithium manganese oxide, and an anode of the spent lithium-ion battery is carbon powder.
(1) Dismantlement The spent lithium-ion battery with lithium manganese oxide as the cathode and carbon powder as the anode was fully discharged and dried, and then manually dismantled in a glovebox to remove the casing, and the separator and the electrodes were separated to obtain cathodes and anodes.
(2) Leaching Out Li and Mn by the Primary Battery Method After the cathodes and anodes were dried, the separator obtained through dismantlement was washed and dried, the cathodes were disposed in a "sandwich" electrode structure as a cathode of a battery-like structure device (the cathode of the spent lithium-ion battery was sandwiched with two layers of platinum meshes), the anode was disposed in the "sandwich" electrode structure as an anode of the battery-like structure device (the anode of the spent lithium-ion battery was sandwiched with two layers of platinum meshes), 1M $H_2SO_4$ was added in the primary battery system as an electrolyte, the polyethylene separator, a cellulose acetate microporous membrane, and a nylon microporous membrane were used as a separator of the battery-like structure device respectively for separation into cathodic and anodic chambers, and the reaction was carried out at a stirring speed of 700 rpm at 40° C. for 120 min. During the reaction, the output voltage of the battery-like structure was tested to be 1.1 V. After the reaction, the resultant solid-liquid mixture was subjected to suction filtration for separation, to obtain a cathodic chamber solution and an anodic chamber solution respectively. The anodic chamber solution was electro-reduced with a copper electrode to obtain a copper sheet, with the voltage for copper electrolysis of 1.8 to 2.5 V, usually controlled to 1.9 V.

Experiments were carried out by controlling variables, and the concentrations of the valuable metals in the cathodic chamber and the anodic chamber were determined through ICP analysis. The results are shown in FIG. 9 and FIG. 10.

Figure 9:
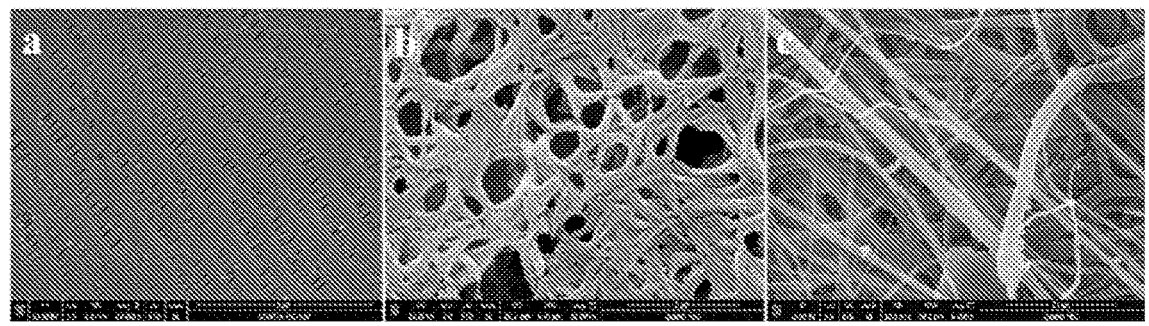
FIG. 9 is an SEM image of a polyethylene separator (a), a cellulose acetate microporous membrane (b), and a nylon microporous membrane (c) in Example 5.

It can be seen from FIG. 9 that different separators have different pore sizes and microscopic morphologies. The polyethylene separator has small and uniformly distributed pores; the cellulose acetate microporous membrane has large but unevenly distributed pores; and the nylon microporous membrane has small but unevenly distributed pores.

Figure 10:
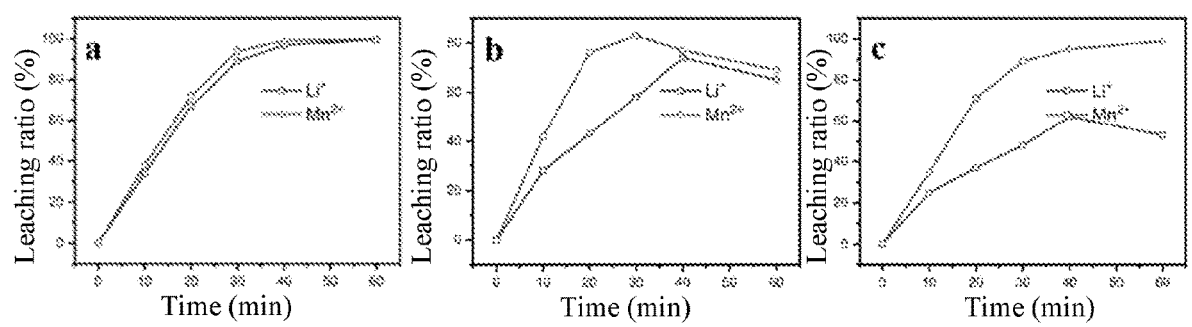
FIG. 10 is a graph showing the change of the leaching ratio of Li and Mn with time when cathodes and anodes of a spent lithium-ion battery are recycled in a sulfuric acid leaching system with a polyethylene separator (a), a cellulose acetate microporous membrane (b), and a nylon microporous membrane (c) in Example 5.

FIG. 10 shows the Li and Mn recovery rates of corresponding to different separators. It can be seen from this figure that the polyethylene separator has the optimal performance, and the Li and Mn recovery rates are the highest and more than 99% at about 40 min. The cellulose acetate microporous membrane has a large flux due to its large pore size, so the leaching rate is high in the first 30 min. However, with time, some of Li and Mn enter the anodic chamber from the cathodic chamber, causing the loss of Li and Mn, so the final recovery rate decreases with time. The nylon microporous membrane has a low leaching rate in the early stage due to its small flux. In addition, due to unevenly distributed pores, some Li ions migrate to the anodic chamber with time, so the leaching ratio of Li ions decreases with time. However, Mn ions have a large radius, so the Mn ions do not migrate to the anodic chamber.

In conclusion, the polyethylene separator has the optimal selectivity, but has a flux lower than the cellulose acetate microporous membrane.

Example 6

In this example, a nitric acid leaching system is used with a separator. A cathode of a spent lithium-ion battery is lithium iron phosphate, and an anode of the spent lithium-ion battery is carbon powder.

(1) Dismantlement

The spent lithium-ion battery with lithium iron phosphate as the cathode and carbon powder as the anode was fully discharged and dried, and then manually dismantled in a glovebox to remove the casing, and the separator and the electrodes were separated to obtain cathodes and anodes.

(2) Leaching Out Li and Fe by the Primary Battery Method

After the cathodes and anodes were dried, the separator obtained through dismantlement was washed and dried, the cathodes were disposed in a "sandwich" electrode structure as a cathode of a battery-like structure device (the cathode of the spent lithium-ion battery was sandwiched with two layers of platinum meshes), the anodes were disposed in the "sandwich" electrode structure as an anode of the battery-like structure device (the anode of the spent lithium-ion battery was sandwiched with two layers of platinum meshes), 1M $HNO_3$ was added in the primary battery system as an electrolyte, the polyethylene separator was used as a separator of the battery-like structure device respectively for separation into cathodic and anodic chambers, and the reaction was carried out at a stirring speed of 800 rpm at 20° C. for 120 min. During the reaction, the output voltage of the battery-like structure was tested to be 1.0 V. After the reaction, the resultant solid-liquid mixture was subjected to suction filtration for separation, to obtain a cathodic chamber solution and an anodic chamber solution respectively. The anodic chamber solution was electro-reduced with a copper electrode to obtain a copper sheet.

Experiments were carried out by controlling variables, and the concentration of the metal ions in the positive electrode chamber was determined through ICP analysis. The results are shown in FIG. 11.

Figure 11:
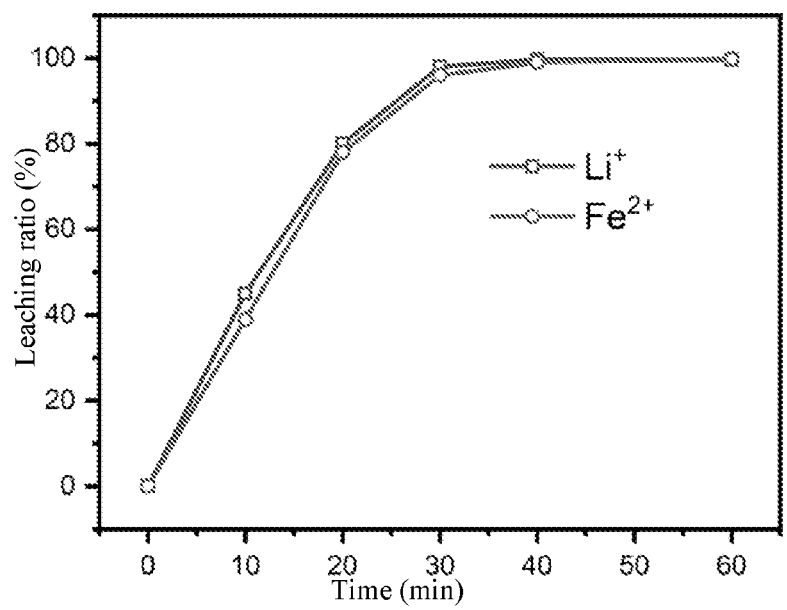
FIG. 11 is a graph showing the change of the leaching ratio of Li and Fe with time when cathodes and anodes of a spent lithium-ion battery are recycled with a nitric acid leaching system in Example 6.

It can be seen from FIG. 11 that the battery-like structure can effectively leach out Li ions and Fe ions, and has a leaching ratio of more than 99% at 40 min.

Example 7

In this example, an oxalic acid leaching system is used without a separator. A cathode of a spent lithium-ion battery is lithium cobalt oxide, and an anode of the spent lithium-ion battery is carbon powder.

(1) Dismantlement

The spent lithium-ion battery with lithium cobalt oxide as the cathode and carbon powder as the anode was fully discharged and dried, and then manually dismantled in a glovebox to remove the casing, and the separator and the electrodes were separated to obtain cathodes and anodes.

(2) Leaching Out Li by the Primary Battery Method

After the cathodes and anodes were dried, the cathodes were disposed in a "sandwich" electrode structure as a cathode of a primary battery system (the cathode of the spent lithium-ion battery was sandwiched with two layers of platinum meshes), and the anodes were disposed in the "sandwich" electrode structure as an anode of the primary battery system (the anode of the spent lithium-ion battery was sandwiched with two layers of platinum meshes). Oxalic acid was added in the primary battery system in a concentration of 3 M and in a volume of 400 mL, at a stirring speed of 1180 rpm, at a reaction temperature of 20° C., for 120 min. After the reaction, the resultant solid-liquid mixture was subjected to suction filtration for separation, to obtain a Li ion-rich leaching solution. During the reaction, the output voltage was 0.78 V.

The reaction equation is as follows:

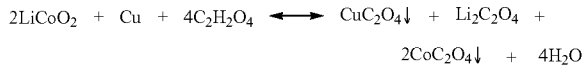

Figure 12:
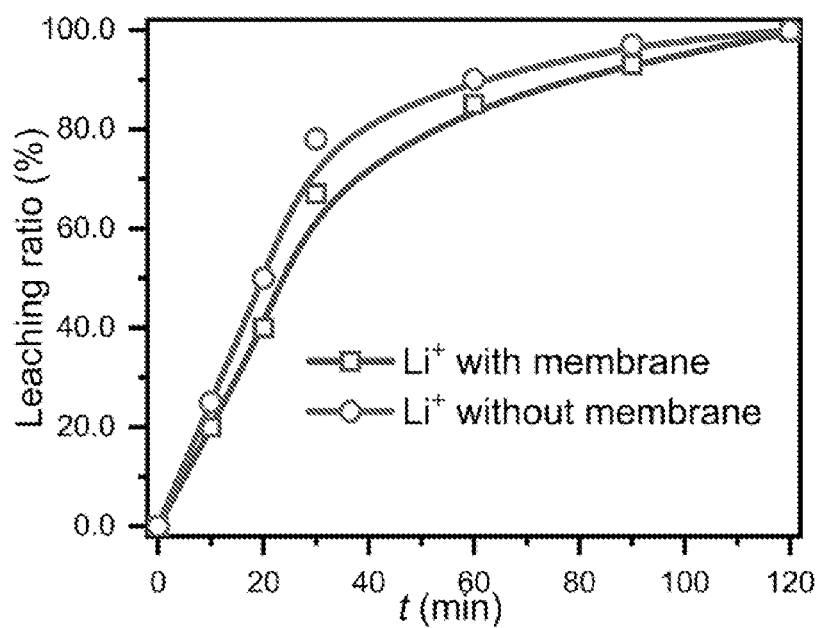
FIG. 12 is a graph showing the change of the leaching ratio of Li with time when cathodes and anodes of a spent lithium-ion battery are recycled with an oxalic acid leaching system in Examples 7-8.

Both the resultant cobalt oxalate and copper oxalate were precipitates, so the recovery rate of Li ions was determined only through ICP. The results are shown in FIG. 12.

It can be seen from this figure that under the above leaching conditions, the leaching ratio of Li finally obtained is >99%.

Example 8

In this example, an oxalic acid leaching system is used with a separator. A cathode of a spent lithium-ion battery is lithium cobalt oxide, and an anode of the spent lithium-ion battery is carbon powder.

(1) Dismantlement

The spent lithium-ion battery with lithium cobalt oxide as the cathode and carbon powder as the anode was fully discharged and dried, and then manually dismantled in a glovebox to remove the casing, and the separator and the electrodes were separated to obtain cathodes and anodes.

(2) Leaching Out Li by the Primary Battery Method

After the cathodes and anodes were dried, the separator obtained through dismantlement was washed and dried, the cathodes were disposed in a "sandwich" electrode structure as a cathode of a battery-like structure device (the cathode of the decommissioned lithium-ion battery was sandwiched with two layers of platinum meshes), and the anodes were disposed in the "sandwich" electrode structure as an anode of the battery-like structure device (the anode of the decommissioned lithium-ion battery was sandwiched with two layers of platinum meshes). Oxalic acid was added in the primary battery system, and the polyethylene separator obtained through dismantlement was used as a separator of the battery-like structure device for separation into cathodic and anodic chambers. Oxalic acid was added in a concentration of 3 M and in a volume of 400 mL, at a stirring speed of 1180 rpm, at a reaction temperature of 20° C., for 120 min. After the reaction, the resultant solid-liquid mixture was subjected to suction filtration for separation, to obtain a cathodic chamber solution (Li ions), a cathodic chamber precipitate (cobalt oxalate), and an anodic chamber precipitate (copper oxalate and graphite powder in the sandwich structure) respectively. During the reaction, the output voltage of the battery-like structure was tested to be 0.65 V.

The reaction equation is as follows:

Overall reaction:

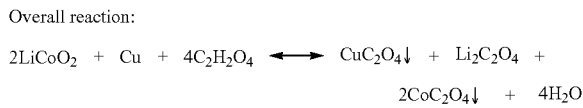

Cathodic chamber:

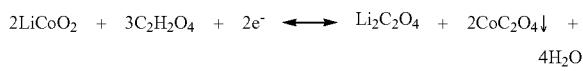

-continued

Anodic chamber:

$$Cu + C_2H_2O_4 \longleftrightarrow CuC_2O_4\downarrow + 2e^-$$

Experiments were carried out by controlling variables, and the concentration of the Li ions in the positive electrode chamber was determined through ICP analysis. The results are shown in FIG. 12.

It can be seen from FIG. 12 that under the above conditions, the recovery rate of Li is >99%. The system with membrane can achieve the separate recycling of cobalt oxalate in the cathodic chamber and copper oxalate in the anodic chamber. However, the system without membrane has a higher output potential due to the lack of membrane resistor.

The foregoing examples are merely preferred examples for fully describing the present invention, and are not intended to limit the protection scope of the present invention. Equivalent substitutions or transformations made by a person skilled in the art on the basis of the present invention shall fall within the protection scope of the present invention. The protection scope of the present invention shall be subject to the claims.

The invention claimed is:

1. A method for recycling a spent lithium-ion battery, comprising the following steps:
   sandwiching a cathode of the spent lithium-ion battery with a conductive acid-resistant material as a cathode of a primary battery system;
   sandwiching an anode of the spent lithium-ion battery with a conductive acid-resistant material as an anode of the primary battery system;
   injecting an acid solution into a chamber of the primary battery system; and
   carrying out, after an electrochemical reaction is completed, solid-liquid separation on a mixed liquor in the chamber.

2. The method for recycling a spent lithium-ion battery according to claim 1, wherein the conductive acid-resistant material is provided with pores.

3. The method for recycling a spent lithium-ion battery according to claim 2, wherein the conductive acid-resistant material comprises at least one of platinum, gold, palladium, lead, titanium, aluminum, copper, stainless steel, graphite, glassy carbon, carbon fiber, graphene, carbon cloth, and carbon felt.

4. The method for recycling a spent lithium-ion battery according to claim 1, wherein a cathode active substance in the cathode comprises one or more of lithium cobalt oxide, lithium manganese oxide, lithium iron phosphate, and lithium nickel-cobalt manganese oxide.

5. The method for recycling a spent lithium-ion battery according to claim 1, wherein an anode current collector in the anode is copper foil, and an anode active substance in the anode comprises one or more of graphite, active carbon, and lithium titanate.

6. The method for recycling a spent lithium-ion battery according to claim 1, wherein the acid solution is organic acid or inorganic acid;
   the organic acid comprises one or more of formic acid, acetic acid, propionic acid, butyric acid, caprylic acid, adipic acid, oxalic acid, malonic acid, succinic acid, maleic acid, tartaric acid, benzoic acid, phenylacetic acid, phthalic acid, terephthalic acid, valeric acid, caproic acid, capric acid, stearic acid, palmitic acid, acrylic acid, ascorbic acid, and malic acid;
   the inorganic acid comprises one or more of hydrochloric acid, sulfuric acid, nitric acid, and phosphoric acid.

7. The method for recycling a spent lithium-ion battery according to claim 6, wherein the concentration of the acid solution is 0.1 M to 5 M.

8. The method for recycling a spent lithium-ion battery according to claim 6, wherein when the acid solution is hydrochloric acid, sulfuric acid, or phosphoric acid, the concentration of the acid solution is 0.5 M to 2 M; when the acid solution is nitric acid, the concentration of the acid solution is 1 M to 5 M; and when the acid solution is organic acid, the concentration of the acid solution is 1 M to 5 M.

9. The method for recycling a spent lithium-ion battery according to claim 1, wherein a separator for separating the cathode and the anode is further provided in the chamber of the primary battery system.

10. The method for recycling a spent lithium-ion battery according to claim 9, wherein an external power supply is further added in an external circuit of the primary battery system, the cathode of the primary battery system is in communication with a cathode of the external power supply, and the anode of the primary battery system is in communication with an anode of the external power supply.

11. An electrochemical system for recycling a spent lithium-ion battery, comprising an electrolyzer, a cathode, and an anode, wherein the electrolyzer is filled with an electrolyte, the cathode and the anode are electrically connected by a wire, and both the cathode and the anode are immersed in the electrolyte, wherein the cathode is obtained by sandwiching a cathode of the spent lithium-ion battery with a conductive acid-resistant material, the anode is obtained by sandwiching an anode of the spent lithium-ion battery with a conductive acid-resistant material, and the electrolyte is an acid solution.

12. The electrochemical system for recycling a spent lithium-ion battery according to claim 11, wherein the conductive acid-resistant material is provided with pores.

13. The electrochemical system for recycling a spent lithium-ion battery according to claim 12, wherein the conductive acid-resistant material comprises at least one of platinum, gold, palladium, lead, titanium, aluminum, copper, stainless steel, graphite, glassy carbon, carbon fiber, graphene, carbon cloth, and carbon felt.

14. The electrochemical system for recycling a spent lithium-ion battery according to claim 11, wherein a plurality of cathodes or anodes of the spent lithium-ion battery are sandwiched in the conductive acid-resistant material.

15. The electrochemical system for recycling a spent lithium-ion battery according to claim 11, wherein a cathode active substance in the cathode comprises one or more of lithium cobalt oxide, lithium manganese oxide, lithium iron phosphate, and lithium nickel-cobalt manganese oxide.

16. The electrochemical system for recycling a spent lithium-ion battery according to claim 11, wherein an anode current collector in the anode is copper foil, and an anode active substance in the anode comprises one or more of graphite, active carbon, and lithium titanate.

17. The electrochemical system for recycling a spent lithium-ion battery according to claim 11, wherein a separator for separating the cathode and anode is further provided in the electrolyzer.

18. The electrochemical system for recycling a spent lithium-ion battery according to claim 17, wherein there are a plurality of cathodes, anodes, and separators, and the plurality of cathodes, anodes, and separators are arranged in the electrolyzer in the repetitive sequence of cathode/separator/anode/separator/cathode/separator/anode.

19. The electrochemical system for recycling a spent lithium-ion battery according to claim 17, wherein an external power supply is further connected onto a circuit between the cathode and the anode, the cathode is in communication with a cathode of the external power supply, and the anode is in communication with an anode of the external power supply.

\* \* \* \* \*